March 17, 1953 — M. P. BLOMBERG — 2,631,875
BRAKE SHOE AND SANDER SUPPORT ADJUSTING
MEANS FOR RAILWAY VEHICLE BRAKES Filed July 1, 1946 — 4 Sheets-Sheet 1

Inventor
Martin P. Blomberg
By Blackmore, Spencer & Hunt
Attorneys

March 17, 1953
M. P. BLOMBERG
2,631,875
BRAKE SHOE AND SANDER SUPPORT ADJUSTING
MEANS FOR RAILWAY VEHICLE BRAKES
Filed July 1, 1946
4 Sheets-Sheet 2
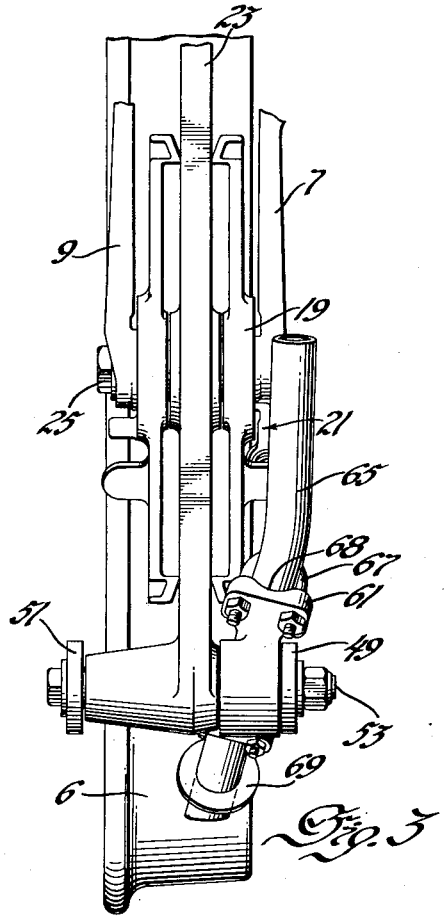
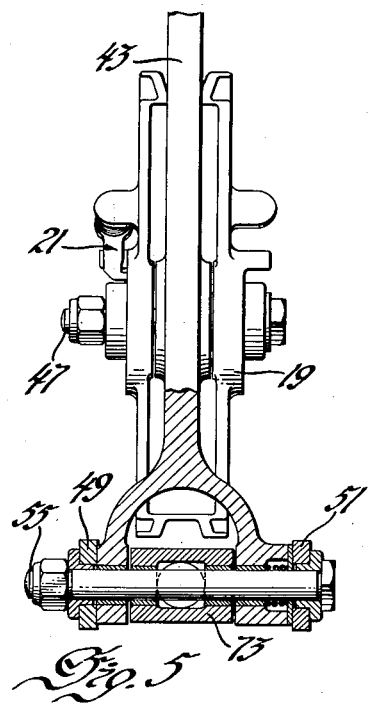
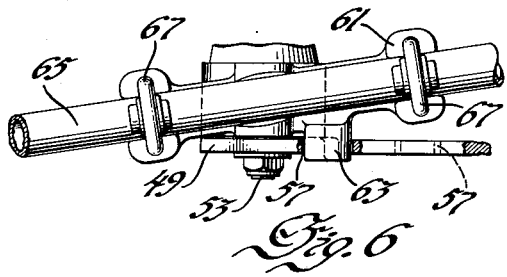
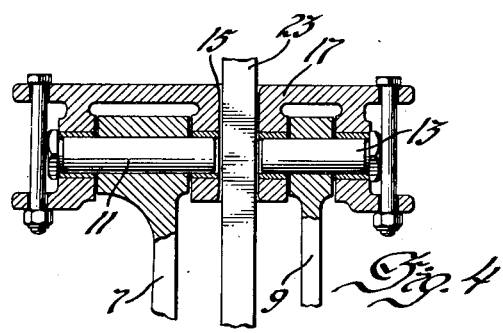
Inventor
Martin P. Blomberg
By Blackmore, Spencer & Flint
Attorneys

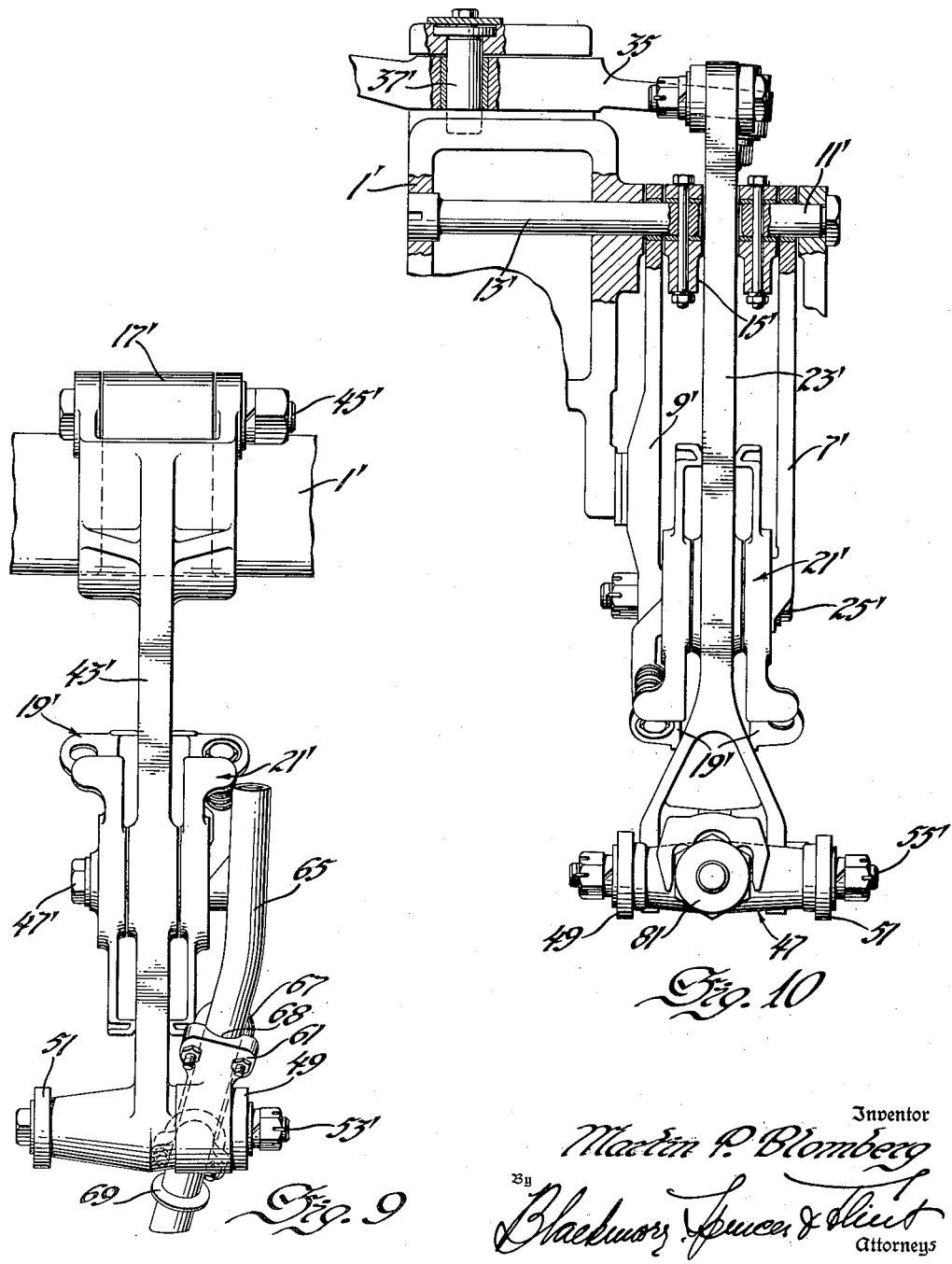

Patented Mar. 17, 1953

2,631,875

UNITED STATES PATENT OFFICE 2,631,875

BRAKE SHOE AND SANDER SUPPORT ADJUSTING MEANS FOR RAILWAY VEHICLE BRAKES

Martin P. Blomberg, Hinsdale, Ill., assignor to General Motors Corporation, Detroit, Mich., a corporation of Delaware Application July 1, 1946, Serial No. 680,763

4 Claims. (Cl. 291—41)

This invention relates to improvements in brake rigging for railway vehicles.

The principal object of the invention is to provide means for adjustably connecting the lower ends of brake levers located on opposite sides of a wheel and movable linearly adjacent the bottom of the wheel and adjustably supporting a sander bracket at one end and slack adjusting means at the other end so that the levers may be readily adjusted to compensate for wheel and brake shoe wear and also to insure delivery of sand to a point immediately adjacent the point of contact of the wheel with the rail for all positions of the brake levers and connecting means.

Figure 1 of the drawings is a partial vertical side elevation view of one end of a traction truck embodying one form of the invention.

Figure 3 is a partial end elevation view taken on line 3—3 of Figure 1 with parts broken away.

Figure 4 is a vertical sectional view taken on line 4—4 of Figure 2 with parts broken away.

Figure 5 is a vertical sectional view taken on line 5—5 of Figure 1 with parts broken away.

Figure 6 is a view taken on line 6—6 of Figure 1 with parts broken away.

Figure 9 is a partial end elevation view taken on line 9—9 of Figure 7 with parts broken away.

Figure 10 is a partial end elevation view taken on line 10—10 of Figure 7 with parts broken away.

Figure 1:
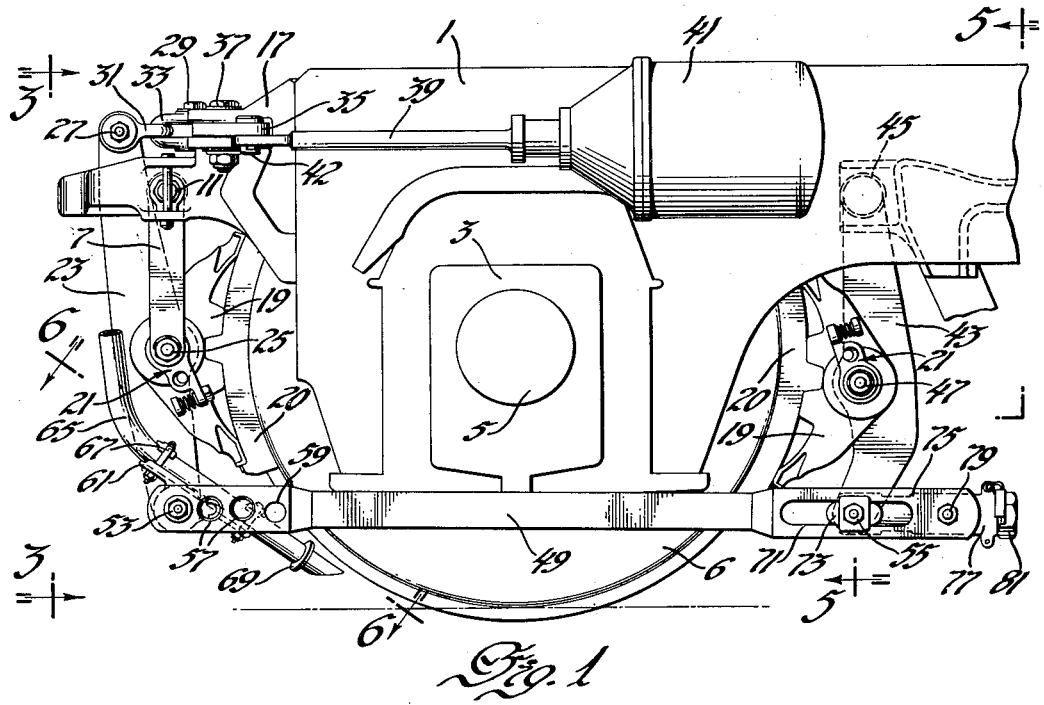
Figure 2:
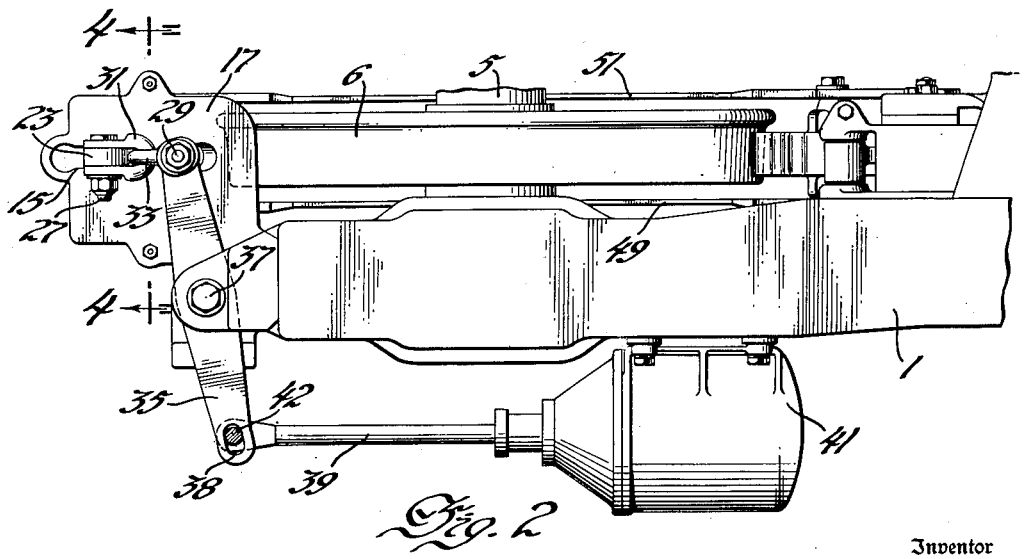
Figure 2 is a partial plan view taken at right angles to Figure 1.

The truck shown in Figures 1–6 comprises a side frame 1 supported by journal boxes 3 on axles 5 having wheels 6 attached thereto in conventional manner. The brake rigging comprises hanger links 7 and 9 pivoted at their upper ends, as best shown in Figure 4, on aligned pins 11—13 located either side of a slot 15 in a bracket 17 at the outer end of the side frame 1 for longitudinal swinging movement outside the wheel 6 and in the plane thereof. A brake head 19 having a brake shoe 20 keyed thereon and brake head balancing means, generally indicated at 21, and a live brake actuating lever 23 for the head are pivoted by means of a bolt 25 between the lower ends of the hangers 7 and 9. The upper end of the lever 23, as shown in Figure 2, is connected by means of bolts 27—29 and clevises 31—33 to one end of a lever 35 pivoted at its center on a vertical bolt 37 in the bracket 17 of the side frame. The other end of the lever 35 is provided with a slot 38 and a piston rod 39, of a brake cylinder 41 secured on the side frame, is connected by a pin 42 extending into the lever slot 38, as best seen in Figure 1. A dead brake lever 43 is located on the other side of the wheel 6 and is pivoted at its upper end to the side frame 1 on a pin 45 for longitudinal swinging movement in the plane of the wheel and another brake head 19 having a shoe keyed thereto and balancing means 21 is pivotally supported by means of a bolt 47 intermediate the ends of the dead lever 43.

The lower ends of the levers 23—43 are pivotally connected to the opposite ends of two tension members or straddle bars 49—51, located on opposite sides of these levers and the wheel, by bolts 53—55 as best shown in Figures 1, 3 and 5. The straddle bars are provided with three bushed openings 57 adjacent the left end and an unbushed opening 59 located inwardly thereof. These openings are equally spaced apart, the unbushed opening 59 being located slightly below the bushed openings 57. The bolt 53 is adapted to be inserted in any of the bushed openings 57 in the straddle bars and through an opening in a sander nozzle bracket 61 and an opening in the lower end of the lever 23 so that the sander bracket is located between the lever and outer straddle bar, as best shown in Figure 3. The sander bracket 61 is provided with a projection 63 on the outer face which is adapted to be freely entered into any particular bushed or unbushed opening located inwardly and next to the bushed opening in which the bolt 53 is entered. As best shown in Figures 1 and 6 the bolt 53 is located in the bushed openings of the straddle bars adjacent the outer end and the bolt 53 and the sander bracket projection 63 is moved inwardly to adjacent openings in the bars to compensate for wear of the brake shoes and wheels.

As best shown in Figures 1, 3 and 6 with the sander bracket 61 mounted in this position the lower straight portion of a curved sander nozzle 65 may be adjustably secured by means of U bolts 67 in a groove 68 in bracket 61 extending diagonally inwardly and downwardly toward a point outside and immediately adjacent the point of contact of the bottom of wheel 6 with the rail. An annular water guard 69 is secured adjacent the lower end of the nozzle 65 to prevent water running down the nozzle and reaching the lower open end, so that only dry sand is ejected to this point on the rail.

The right or inner ends of the straddle bars

49—51 are provided with aligned slots 71, as best shown in Figure 1, and the bolt 55 extends between the slots in the bars and through openings in the lower bifurcated end of the dead lever 43 and also through an opening in an adjustable element 73 of a slack adjuster of a well known type generally indicated at 75 and having a body portion 77 secured by means of a bolt 79 between the inner ends of the straddle bars and provided with manual adjusting means 81 for the movable element 73 of the slack adjuster. The slack adjuster mechanism 75 thus provides means whereby the bolt 55 pivotally connecting the dead lever to the inner ends of the straddle bars may be conveniently adjusted with respect to the inner ends of the straddle bars 49—51 to compensate for wear of the brake shoes and wheels.

The above described truck brake rigging accordingly provides means whereby the lower ends of the live and dead levers 23—43 may be conveniently adjusted with respect to the straddle bars 49—51 to compensate for brake shoe and wheel wear and the sander bracket 61 may be pivotally connected to the lower end of the live lever 23 and to the outer end of the straddle bars in different linear and angular positions and the sander nozzle 65 may be adjusted with respect to the sander bracket 61 so that sand is applied outside and immediately adjacent the point of contact of the wheel with the rail. The location of the unbushed opening 59 in the outer end of the straddle bars located slightly below the bushed openings 57 also enables the bracket to be angularly tilted relative to the live lever 23 and straddle bars when the bolt 53 and sander bracket projection 63 are in the openings 57 and 59, respectively, furthest from the outer end. It will be evident that when air pressure is applied to the brake cylinder 41 the piston 39 and linkage connected to the upper end of the live lever 23 will cause it to rotate clockwise about the bolt 53 serving as a fulcrum to apply the outside brake shoe to the wheel and also to move the bolt 55 and straddle bars 49—51 linearly outwardly to the left a slight amount and thereby move the dead lever 43 clockwise about the pin 45 at its upper end serving as a fulcrum and thereby cause simultaneous application of the other brake shoe to the opposite inner side of the wheel 6. As the sander bracket 61 is pivotally supported on the bolt 53 and also in the outer end of the outer straddle bar 49 it will accordingly be moved linearly outwardly only a slight amount from the point of contact of the wheel on the rail when the brakes are applied.

The truck and brake rigging thereon shown in Figures 7 to 10 differs chiefly from the one previously described in that the live lever is located adjacent the inside of the wheel and the dead lever is located adjacent the outside of the wheel and also differs in other minor details. The same character references are applied to parts identical with those previously described and similar parts are indicated by character references followed by a "prime" mark in the following brief description of the differences between the truck and brake linkage shown in Figures 7 to 10.

Figure 7:
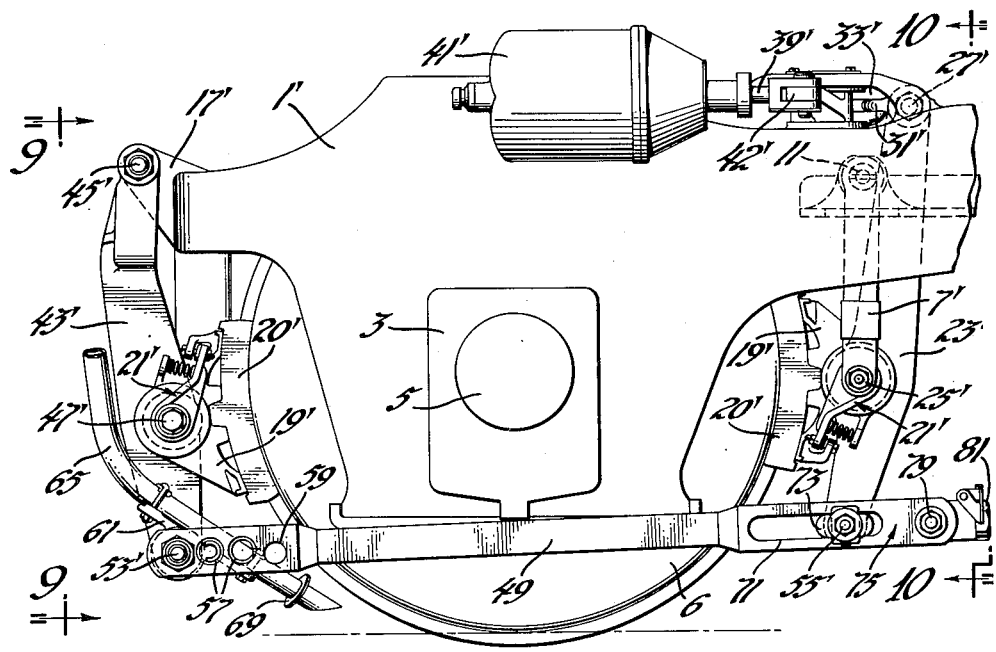
Figure 7 is a partial vertical side elevation view showing another form of railway traction truck provided with a modified form of brake rigging.
Figure 8:
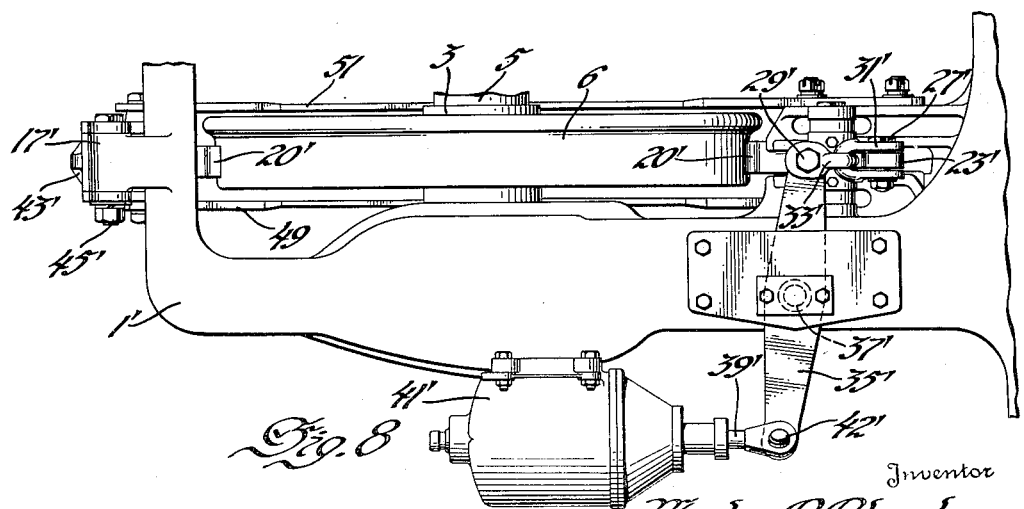
Figure 8 is a partial plan view taken at right angles to Figure 7.

In Figures 7, 9 and 10 it will be seen that the live lever 23' is pivoted intermediate its ends on a bolt 25' between the lower ends of hanger links 7'—9' and the upper ends of the links are pivotally supported on pins 11'—13' on the side frame 1' for longitudinal swinging movement inside the wheel 6 and in the plane thereof. A brake head 19', having a brake shoe 20' keyed therein and also the head balancing means 21' are also pivotally mounted on the bolt 25'. The upper end of the live lever 23' is connected by bolts 27'—29' and clevises 31'—33' to one end of a lever 35' pivoted at its center on a vertical bolt 37' on the side frame 1'. The other end of the lever 35' is connected at the other end by a pin 42' to the piston rod 39' of the brake cylinder 41' secured to the side frame 1'. The dead lever 43' is pivoted at its upper end by means of a bolt 45' on a bracket 17' on the outer end of the side frame 1' for longitudinal swinging movement outside the wheel 6 and in the plane thereof. Another brake head 19' having a shoe 20' keyed therein and head balancing means 21' are pivotally connected by means of a bolt 47' intermediate the ends of the dead lever 43'.

Straddle bars 49—51 including a slack adjuster 75 thereon and identical to those previously described are shown connecting the lower ends of the live and dead levers 23'—43'. A sander bracket 61 identical to that previously described is pivotally mounted on the outside straddle bar 49 and on a bolt 53' which also serves to pivotally attach the dead lever 43' between the bars when inserted in any of the openings in the outer ends thereof and a bolt 55' serves to pivotally connect the lower bifurcated end of the live lever 23' to the movable element 73 of the slack adjuster 75 on the inner end of the straddle bars in a similar manner to that previously described.

With the brake rigging shown in Figures 7, 8, 9 and 10 it will be evident that the straddle bars 49—51 and sander bracket 61 will be moved linearly inwardly a slight amount when the brakes are applied by application of air pressure to the brake cylinder 41'. The sander bracket 61 will accordingly be moved linearly inwardly a slight amount closer to the point of contact of the wheel with the rail with the brake rigging arrangement shown in Figures 7 to 10.

By including a sander bracket on the outer end of the straddle bars below the wheel center and a slack adjuster at the inner end below the wheel center adjustments to compensate for wheel and brake shoe wear may be readily made and sand can be applied immediately adjacent the point of contact of the wheel on the rail for all positions of the levers and bars relative to the wheel. It will be noted that the sander bracket enables the nozzle to be located closer to the wheel and below the outer end of the side frame so as to not interfere with adjacent parts of the vehicle cab or body structure.

I claim:

1. In a brake rigging for a railway vehicle having supporting wheels and axles adjacent the ends thereof, the combination of brake rigging comprising a vertical brake lever suspended outwardly of each of the wheels adjacent each end of the vehicle, a brake shoe supported on each brake lever, each brake lever having a pivot connection in the lower end located below the centers of rotation of said wheels, a sander nozzle support bracket for each vehicle wheel having a pivot connection and a projection spaced therefrom; brake lever connecting bars extending horizontally inwardly of the lower end of each brake lever; each connecting bar having a plurality of pivot connections spaced apart adjacent one end thereof, the projection of each sander nozzle bracket being supported in a pivot connection of one of said connecting bars, and pivot means pivotally connecting the pivot connection of each brake lever and each sander nozzle bracket with an adjacent pivot connection of a connecting bar, to position the brake shoes and sander nozzle brackets with respect to said vehicle wheels during application and release of the brake shoes.

2. In a brake rigging for a railway vehicle truck having a frame and supporting wheels and axles adjacent the ends thereof, the combination of brake rigging including a pair of outer and inner brake levers suspended on the truck frame and located outwardly and inwardly, respectively, of each of said truck wheels, each lever having a pivot connection in the lower end located below said axles, a brake shoe connected to each brake lever, a pair of brake lever connecting bars extending horizontally along each face of each wheel and between said levers for each such wheel, each pair of lever connecting bars having a pivot connection at the inner ends for an inner brake lever, and a plurality of horizontally spaced aligned pivot connections adjacent the outer ends for an outer brake lever, pivot means interconnecting the pivot connections at the inner ends of each pair of bars to the pivot connection of an inner brake lever, a sander nozzle bracket for each of said truck wheels having a pivot connection and a pivot projection spaced therefrom, said pivot projection being engaged with a particular pivot connection adjacent the outer end of one bar of a pair of connecting bars, and pivot means interconnecting the pivot connection of each brake lever located outwardly of an end wheel with the pivot connection of a sander nozzle bracket and with aligned pivot connections of each pair of connecting bars located horizontally outwardly of the sander braket nozzle pivot projection to position the brake shoes and sander nozzle brackets relative to the end wheels of the truck to compensate for wear of the brake shoes and wheels.

3. In a clasp type brake rigging for railway vehicle truck having side frame portions and supporting axles and wheels adjacent the ends of the side frame portions, the combination of brake rigging including brake levers suspended on the truck side frame portions and located outwardly and inwardly of each of the end truck wheels, each lever having a pivot connection in the lower end located below the axles, a pair of straddle bars extending horizontally along the sides of each end truck wheel below the wheel axle and between the outer and inner wheel brake levers, a slack adjuster secured to the inner ends of each pair of bars and having a horizontally adjustable pivot connection, pivot means interconnecting the pivot connections of each inner wheel brake lever with the adjustable pivot connection of a slack adjuster, each pair of straddle bars also having a plurality of equally spaced aligned pivot connections adjacent each outer wheel brake lever, certain of these inwardly disposed pivot connections being located below the others, a sander nozzle bracket for each end truck wheel, each bracket having a pivot projection engaged in one of said inwardly disposed pivot connections in one bar of a pair and a pivot connection displaced outwardly therefrom in alignment with adjacent, aligned pivot connections of a pair of bars, and pivot means interconnecting the aligned pivot connections of each sander nozzle bracket of said pair of bars with the pivot connection of each outer wheel brake lever to adjustably position the brake shoes and sander nozzle brackets angularly and horizontally with respect to the end wheels of the truck upon wear of the shoes and wheels and to cause application and release of the brake shoes and maintain the sander nozzle brackets in proper position outwardly of the point of engagement of each end truck wheel with the rail during application and release of the shoes to the wheels.

4. In a clasp type brake rigging for a railway vehicle truck having side frame portions and supporting wheels and axles adjacent the ends thereof, the combination of outer and inner brake rigging comprising brake levers suspended from the truck side frames and located outwardly and inwardly with respect to each end wheel, each lever having a transverse opening in its lower end below the axles, a brake shoe supported on each brake lever, a pair of straddle bars extending horizontally between the lower ends of the inner and outer wheel brake levers to cause application of the brake shoes to the wheel or release thereof upon movement of one lever in one direction or the other, a slack adjuster secured between the inner ends of each pair of straddle bars adjacent each inner wheel brake lever, said slack adjuster having a manually operable element having a transverse opening therein and movable axially with respect to the bars, a connecting bolt extending through the transverse openings in each slack adjuster element and an inner wheel brake lever, the outer ends of each pair of straddle bars adjacent each outer wheel brake lever having a plurality of equally spaced transversely aligned openings, the inner pair of said aligned openings being located below the others, a sander nozzle directing bracket for each end truck wheel, each bracket having a transverse opening adjacent one end and a transverse pivot projection thereon engageable in any one of the inner openings in the outer end of a straddle bar to align the bracket opening therein with adjacent transversely aligned openings in a pair of bars nearer the outer ends, and a connecting bolt extending through the aligned openings in each sander nozzle bracket and a pair of straddle bars and also through the transverse opening in an outer wheel brake lever, the sander nozzle bracket being positioned angularly with respect to the wheel when the projection thereon is engaged in the lower inner opening of a bar below the other aligned openings adjacent the outer end, to vary the position the brake shoes and sander nozzle brackets with respect to the end truck wheels for wear of the shoes and wheels in order to maintain the sander nozzle brackets in proper position during application and release of the brake shoes.

MARTIN P. BLOMBERG.

REFERENCES CITED

The following references are of record in the file of this patent:

UNITED STATES PATENTS

| Number | Name | Date |
|---|---|---|
| 2,304,878 | Blomberg | Dec. 15, 1942 |
| 2,385,909 | Aurien | Oct. 2, 1945 |